United States Patent
Zimmer et al.

(10) Patent No.: US 10,591,651 B2
(45) Date of Patent: Mar. 17, 2020

(54) MICRO-OPTICAL ELECTROMAGNETIC RADIATION DIFFRACTION GRATING AND METHOD FOR MANUFACTURE

(75) Inventors: Fabian Zimmer, Dresden (DE); Alexander Wolter, Dresden (DE); Harald Schenk, Dresden (DE)

(73) Assignee: HIPERSCAN GMBH, Dresden (DE)

( * ) Notice: Subject to any disclaimer, the term of this patent is extended or adjusted under 35 U.S.C. 154(b) by 824 days.

(21) Appl. No.: 13/207,540

(22) Filed: Aug. 11, 2011

(65) Prior Publication Data

US 2012/0033214 A1    Feb. 9, 2012

Related U.S. Application Data

(63) Continuation-in-part of application No. 12/088,010, filed as application No. PCT/DE2005/001799 on Sep. 30, 2005, now abandoned.

(51) Int. Cl.
*G02B 5/18* (2006.01)
*G02B 26/08* (2006.01)

(52) U.S. Cl.
CPC .......... *G02B 5/1847* (2013.01); *G02B 5/1861* (2013.01); *G02B 26/0808* (2013.01)

(58) Field of Classification Search
CPC .......... G02B 5/18–1871; G02B 27/4233–4261; G02B 27/1086–1093; G02B 5/1847;
(Continued)

(56) References Cited

U.S. PATENT DOCUMENTS

| 4,281,894 A | 8/1981 | Guha |
| 4,426,130 A | 1/1984 | Knop |

(Continued)

FOREIGN PATENT DOCUMENTS

| EP | 0444350 B1 * | 7/1995 | ............... H01S 5/12 |
| EP | 1 645 893 A1 | 4/2006 | |

(Continued)

OTHER PUBLICATIONS

Gruger et al., "Performance and Applications of a spectrometer with micromachined scanning grate", Integrated Optics: Devices, Materials, and Technologies VII, Proceedings of SPIE, vol. 4987, 2003, 8 pages.

(Continued)

*Primary Examiner* — Kimberly N. Kakalec

(74) *Attorney, Agent, or Firm* — Barnes & Thornburg LLP

(57) ABSTRACT

The invention relates to electromagnetic radiation microoptical diffraction gratings and to a method suitable for the manufacture thereof. The diffraction gratings in accordance with the invention can be used as microspectrometers in the form of scanning microgratings. The microgratings are provided with a surface structure and are able to be manufactured cost effectively and in high volumes. The surface structure is formed at a surface of a substrate and is formed from linear structural elements arranged substantially equidistantly and aligned substantially parallel to one another. At least part of the surface of the substrate and of the structural elements is coated with at least one further layer which forms a uniform sinusoidal surface contoured in a waveshape (sinusoidal) manner and having alternating arranged wave peaks and wave troughs. A reflective layer can additionally be applied to increase the intensity of reflected radiation.

16 Claims, 1 Drawing Sheet

(58) Field of Classification Search
CPC .............. G02B 5/1861; G02B 26/0808; G02B 5/1823; G01J 3/18–24
USPC .................. 359/566–576; 356/305, 326–334
See application file for complete search history.

(56) References Cited

U.S. PATENT DOCUMENTS

| | | | |
|---|---|---|---|
| 4,828,356 A | | 5/1989 | Hobrock et al. |
| 5,021,649 A | * | 6/1991 | Nishimura .............. G01D 5/38 250/231.16 |
| 6,424,436 B1 | | 7/2002 | Yamanaka |
| 6,829,050 B2 | | 12/2004 | Ikeda et al. |
| 2001/0046055 A1 | * | 11/2001 | Speckbacher ........ G02B 5/1871 356/499 |
| 2002/0098257 A1 | | 7/2002 | Ikeda et al. |
| 2003/0234982 A1 | * | 12/2003 | Shimmo et al. ............. 359/566 |
| 2004/0141108 A1 | * | 7/2004 | Tanaka ................. G02B 6/0038 349/96 |
| 2004/0190141 A1 | | 9/2004 | Wolfe et al. |
| 2004/0196556 A1 | | 10/2004 | Cappiello |
| 2006/0077554 A1 | | 4/2006 | Schenk |

FOREIGN PATENT DOCUMENTS

| | | | |
|---|---|---|---|
| JP | 02244003 A | * | 9/1990 |
| WO | 01/29148 A1 | | 4/2001 |

OTHER PUBLICATIONS

Offical action from Chinese Patent Application 200580051718.2 dated May 22, 2009, 12 pages.
Offical action from Chinese Patent Application 200580051718.2 dated Nov. 20, 2009, 9 pages.
International search report for PCT/DE2005/001799 dated Apr. 21, 2006, 5 pages.

* cited by examiner

MICRO-OPTICAL ELECTROMAGNETIC RADIATION DIFFRACTION GRATING AND METHOD FOR MANUFACTURE

CROSS-REFERENCE TO RELATED APPLICATIONS

This application is a continuation-in-part of U.S. Ser. No. 12/088,010 filed Jun. 3, 2008, now abandoned. U.S. Ser. No. 12/088,010 claims the benefit under the Paris Convention of the Sep. 30, 2005 filing date of PCT/DE2005/001799. The disclosures of both of PCT/DE2005/001799 and U.S. Ser. No. 12/088,010 are hereby incorporated herein by reference.

FIELD OF THE INVENTION

The invention relates to micro-optical electromagnetic radiation diffraction gratings and to a method for the manufacture thereof. The micro-optical electromagnetic radiation diffraction gratings of this disclosure can be used as microspectrometers which can be used as scanning microgratings.

BACKGROUND OF THE INVENTION

Micro-spectrometers with pivotable diffraction gratings have been described, for example, by H. Gruger et al. in "Performance and Applications of a spectrometer with micromachined scanning grating"; Micromachining and Microfabrication, part of SPIE Photonic West (2003).

Very small micromechanical systems are desired for a number of applications such as for scanning Accordingly, the diffraction gratings described in this disclosure are provided in correspondingly small form. The diffraction gratings are pivoted about an axis of rotation and the electromagnetic radiation which is directed onto such a diffraction grating from a corresponding radiation source is guided sequentially in a spectral range via one or more detectors suitable for the detection of specific wavelengths of the electromagnetic radiation.

Usually, highly precise and efficient micro-optical diffraction gratings are manufactured by a casting process from a so-called "master" or by holographic processes. For the manufacture from a master, the master must be created in advance. The creation of the master takes place such that equidistant lines are formed in a substrate, which consists, for example, of metal, by means of a scoring tool. The manufacture of the micro-optical diffraction gratings from such a master can then, for example, take place by means of a hardening plastic, for example, from epoxy resin. Subsequent to the manufacture of the micro-optical diffraction grating, a metallic layer of high reflectance can be applied to a surface of such a manufactured structure.

It is, however, problematic in this connection that a considerable mechanical pressure is required for the forming of the micro-optical diffraction grating and that considerable compressive forces act on the substrates which typically have a thickness of only some few 10 μm. Problems moreover occur with the required lateral adjustment precision.

In addition, the possible number of pieces of individual diffraction grating elements from such a manufacture of the micro-optical diffraction grating from the master is limited. The production costs of such micro-optical diffraction gratings suitable for micromechanical applications are naturally thereby increased.

The holographic processes for the manufacture of the micro-optical diffraction gratings are based on the interference principle by use of laser radiation. An intensity profile arises by interference of partial laser rays to produce an interference pattern. The intensity profile is substantially sinusoidal and with which a photosensitive layer on a substrate is illuminated with the interference pattern. This interference pattern (intensity profile) is then transferred onto the photosensitive layer in topological form after exposure and subsequent development. The photosensitive layer can subsequently be coated with a highly reflective metal film.

However, manufacturing apparatus, such as is usually used in a mature form in semiconductor manufacture, cannot be used for the manufacture of the micro-optical diffraction grating of this disclosure, so that an additional device in such a manufacturing apparatus is required.

It is moreover known to manufacture the micro-optical diffraction gratings with a corresponding surface topology by known process techniques of gray-scale lithography. In this connection, however, the number and/or spacing of the individual lines of the micro-optical diffraction grating is limited, so that the spectral resolution of the micro-optical diffraction grating is likewise limited.

The micro-optical diffraction gratings can, however, also be manufactured by a simple structuring of a reflective layer applied to the substrate. In this connection, a rectangular micro-optical diffraction grating can be obtained to a first approximation. The micro-optical diffraction gratings manufactured in this way, however, have a low effectiveness and can accordingly only be used for spectral analysis with high-intensity sources of electromagnetic radiation.

The manufacture of structural elements on a substrate for other purposes and in different sizes is generally known. U.S. Pat. No. 6,424,436 B1, for example, describes a holographic element which comprises a corrugated surface configuration with grooves and ridges of moderate depth and height corresponding to the pitch of the corrugated surface configuration. The holographic element is for switching light paths in dependence on the polarization directions of an incident light and comprises a plurality of regions formed substantially periodically on a substrate, by which regions the transmitted light has different phase differences between its polarization components as a whole. The pitches are less than or equal to the wavelength of the incident light. Each region, in which the corrugated surface is formed, is coated by a multilayer film comprising a plurality of layers which are made of isotropic materials of different refractive indices and laminated in such a manner that the refractive index in the film varies periodically across the thickness thereof.

The holographic element is formed on the substrate by applying a photoresist film and exposing the photoresist film to a holographic interference for forming a fine pattern. Subsequently, the substrate is subjected to a dry etching process with the photoresist film with the pattern being used as a mask. Grooves each having a width less than or equal to a half of the wavelength of a light to be incident upon the finished holographic element are formed in the substrate at a pitch equal or less than or equal to a half of the wavelength of the light.

US 2002/0098257 A1 describes the manufacture of a reflection type liquid crystal display device that displays an image by reflecting external light instead of using a backlight. Liquid crystal driving elements such as TFT are formed on the surface of a substrate. As all of the liquid crystal driving elements form a matrix of pixels. The liquid crystal driving elements are usually arranged equidistantly and in parallel to each other. The manufacturing process comprises the steps of preparing a cylindrical die unit, an outer circumferential surface of which is formed with a micro-asperity pattern. The substrate is coated with a resin film. The micro-asperity pattern is formed on the resin by pressing the outer circumferential surface of the die unit against the resin film with pressurizing means while rolling the die unit on the thin resin film. The resin film may be made of thermoplastic material and a heating unit for heating the die unit. The temperature of the resin film is kept lower than its heat decomposition temperature. By heating the resin film, the modulus of elasticity of the thin resin film can be decreased and its flowability can be increased. Thus the loads necessary for the processing such as the pressure are decreased, which makes it possible to manufacture an optical device having an accurate micro-asperity pattern.

The heating taught in US '257 serves therefore the sole purpose of easing the pressure of an embossment roll that is pressed against the thin resin film. However, the heating by itself does not cause any change of the resin film surface. The micro-asperity ultimately is caused by the surface of the embossment roller only and is not influenced by the liquid crystal elements. As can be seen for example from FIG. 16 of US '257 the grooves and pitches of the micro-asperity resin film are not in line with the liquid crystal driving elements.

SUMMARY OF THE INVENTION

The disclosure teaches a micro-optical electromagnetic radiation diffraction grating with a surface structure which can be manufactured in a cost-effective manner and in high volumes.

DETAILED DESCRIPTION OF THE INVENTION

Figure 1:
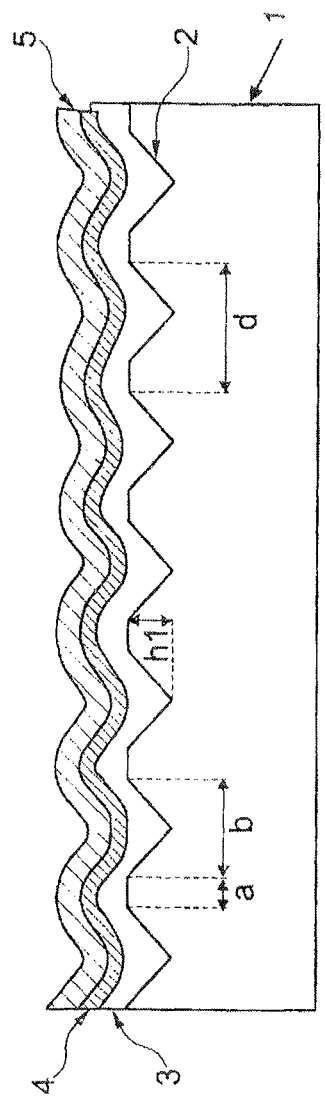
FIG. 1 a partial section of an example for a diffraction grating in accordance with the invention, as a reflection grating, in a schematic representation.

The micro-optical electromagnetic radiation diffraction gratings of the disclosure are made such that a surface structure is formed at a surface of a substrate.

This surface structure comprises a plurality of linear structural elements which are arranged substantially equidistant from one another and aligned substantially parallel to one another. The plurality of linear structural elements form elevated portions on the surface of the substrate. The elevated portions can be manufactured also by forming linear recesses or grooves in the surface of the substrate.

At least one layer is then formed over the whole surface or over part of the surface of the substrate, that is, also over at least some of the surfaces of the linear structural elements. The at least one layer forms a substantially uniform sinusoidal surface structure contoured in a wave-shape manner and having alternating arranged wave peaks and wave troughs. Such a wave-shaped surface structure can be formed independently of the linear surface structure in the formation of the at least one layer, since a rounding effect can be implemented in a layer forming technology which can be used for the manufacture of the micro-optical diffraction gratings.

The cross-sectional geometry of the linear structural elements formed on the surface of the substrate is substantially insignificant. The linear structural elements can thus have triangular, rectangular or also trapezoidal cross-sectional shapes with corresponding edge regions and nevertheless an almost continuous wave-shaped surface structure can be formed.

At least partly elliptical cross-sectional shapes of the linear structural elements can be formed, for example, by lateral etching. The lateral etching can also be easily controlled in the formation of the wave-shaped surface contour.

The at least one layer forms a substantially uniform sinusoidal surface structure. This can be achieved by making the at least one layer from a material or from a material mix which is plastically deformable under the application of energy. The application of energy should preferably be carried out after the formation of the at least one layer. In this connection, the viscosity of the material or the material mix can be reduced to the extent the material or the material mix flows and due to surface tension deforms during the application of energy. The deformation of the at least one layer is substantially maintained after the end of the application of energy. A much more regularized surface topology can thereby be obtained which is made at least substantially sinusoidal and uniform wave peaks and wave troughs with convex or concave curvatures can be formed.

Suitable ones of the materials or the material mixes are, for example, silicon oxyde (SO2) phosphosilicate glass (PSG), borosilicate glass (BSG), borophosphosilicate glass (BPSG), silicon nitride, metals, for example, Al, Ni, Au, Ag, Cr, Cu or also metal alloys such as AlSiCu, AlCu or polymers such as BCB, PMMA, SU-8, polyamides, or photoresists (for example, AZ 7212, AZ 7217). It will be appreciated that the teachings of the disclosure are not limited to such materials and/or material mixes.

The application of energy can take place in different ways. A radiation with electromagnetic waves which are preferably absorbed by the material or the material mix can be used.

A thermal treatment can, however, also be carried out in a different fashion by annealing the at least one layer in a furnace.

There is also the possibility of applying the energy by means of electrical resistance heating or induction, whereby electrically conductive parts can be connected to an electrical voltage source in suitable form or the coated substrate can be exposed to an electrical or electromagnetic alternating field.

The plastic deformability can also be achieved by chemical activation of the material or the material mix as a result of the application of energy.

The surface of the substrate on which the linear structural elements are arranged can be substantially smooth and planar. The micro-optical diffraction gratings of the disclosure are used in a predetermined spectral range of electromagnetic radiation.

The micro-optical diffraction gratings of the disclosure are used as transmission gratings or also as reflection gratings.

With a transmission grating, the at least one layer, for example, made from the substrate material, should then be applied to the substrate. The substrate is transparent to the respective radiation range and the wave-shaped surface should be formed as this at least one layer.

In the case of reflection gratings, the at least one layer can be formed from a material which reflects the electromagnetic radiation. A plurality of such reflective layers can be formed on top of one another. Highly reflective metals or metal alloys can thus be used for such reflective layers, for example, aluminium, silver, gold or a corresponding alloy.

Aluminium, for example is suited to be used in semiconductor manufacturing process, for example in a CMOS process, and reflects radiation in the range from ultra-violet light far into infra-red light. Additives to the aluminium, such as approximately 2% silicon and/or approximately 0.5% copper may be used to influence other properties of the reflective layer. Gold is suited for electromagnetic radiation with a wavelength in the infra-red range and will cause less stress to the material. The reflection ratio of silver in the infra-red range of electromagnetic radiation is almost as good as gold. A protective layer on top of the silver layer may be required to protect the silver layer from corrosion.

In the event that a plurality of layers are formed on the surface of the diffraction grating, the plurality of layers do not necessarily all have to be formed from correspondingly reflective materials. There is thus the possibility of forming reflective multilayer systems of alternating arranged layers of a material with a higher optical refractive index and of a material with a lower optical refractive index. The multilayer system is then likewise able to form the micro-optical reflection grating.

In this connection, however, interference can also be used and the thicknesses of the layers of the multilayer systems for presettable wavelengths can each be formed as so-called $\lambda/4$ layers, with the layer thicknesses then taking up a whole number multiple of $\lambda/4$ of a correspondingly predetermined wavelength. In this connection, an angle of incidence of the corresponding electromagnetic radiation onto the irradiated surface of the micro-optical diffraction grating is naturally a parameter to be taken into account.

With the micro-optical diffraction gratings in accordance with the disclosure, a matching to selected wavelength spectra such as extreme ultraviolet (EUV), deep ultraviolet (DUV), ultraviolet, visible light, near infrared (NIR) and infrared is possible.

The micro-optical diffraction gratings in accordance with the invention can be manufactured such that one of the layers, for example, a photoresist layer, is formed on a surface of the substrate and the photoresist layer is structured by a photolithographic process with a subsequent developing step so that in a following etching step, for example, by known dry physical methods or dry chemical methods or wet chemical methods, the linear recesses can be formed in the substrate and thereby the linear structural elements in the substrate. This allows use to be made of conventional manufacturing apparatus, such as is usually used in the semiconductor industry.

A structuring of the substrate can thus be obtained with current technology with the linear structural elements of more than 5000 on 1 mm.

A desired preselected surface structure (topology) with a suitable cross-sectional profile can be formed in a reproducible manner.

A substrate pre-treated in the manner described above can then be coated with at least one layer which forms the wave-shaped surface structure. PVD or CVD processes known per se can be used for the forming of the at least one layer.

There is also the possibility of simultaneously processing a correspondingly large-format micro-optical diffraction grating or a plurality of small-format micro-optical diffraction gratings on the substrate in a single processing step. The single piece costs of the micro-optical diffraction grating can be considerably reduced over conventional solutions.

Furthermore, impurity atoms (dopants) can be implanted into at least one of the layers. This results in adapted or optimized flow properties, strains, stress or adapted thermal coefficients of expansion of the at least one layer.

Additionally at least one side layer can be formed on a side of the substrate. The residual stress relationships of the substrate and the surface layers can thereby be influenced by the side layer. There is the possibility of thereby compensating residual stresses present in the micro-optical diffraction grating.

A direct deformation of the micro-optical diffraction grating can also be achieved by forming one or more of the side layer(s) on the substrate at least one side. For example, an arching of the structured surface can thus be compensated and a smooth planar surface can be achieved, with the exception of the surface topology due to the linear structural elements.

A concave or convex arching/curvature of the structured surface can also be achieved by having the side layers acting on the substrate to influence the optical properties, for example, the focal length.

In this connection, the stress relationships and, where necessary, the concave or convex arching/curvature of the structured surface can be selected for the micro-optical diffraction grating, while taking account of the operating temperature range of the micro-optical diffraction grating.

This operating temperature vary can be influenced, for example, by a suitable selection of the materials or material mixes with corresponding thermal coefficients of expansion, of the number and/or of the thickness of the layers, for at least one side of the substrates.

The microscopic electromagnetic radiation diffraction grating is used in a device for measuring spectra of microscopic samples or microscopic areas on samples. For this purpose the device comprises an actuator for mechanically steering a support element, for example in a pivotable motion. The microscopic electromagnetic radiation diffraction grating is mounted on said support element or is an integral part of the support element. As micro actuators and the microscopic electromagnetic radiation diffraction grating may be manufactured with the same process technology, for example, in a silicon process, the device for measuring spectra of microscopic samples can be fabricated in a cost effective way.

EMBODIMENTS OF THE INVENTION

Figure 2:
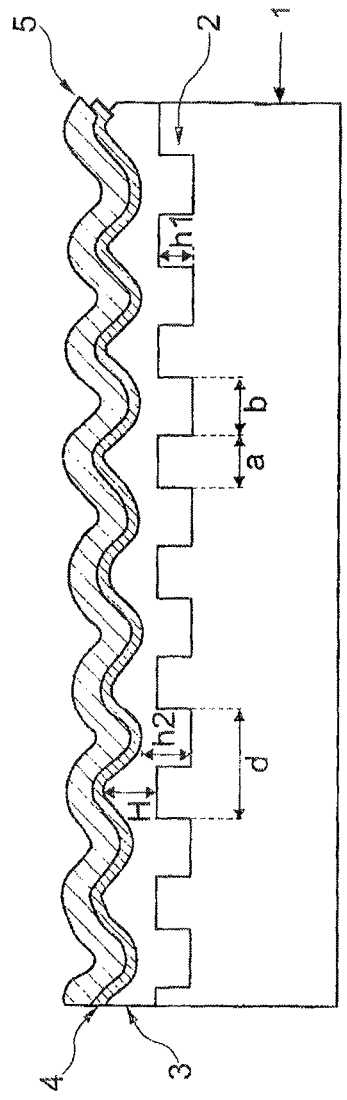
FIG. 2 a partial section of a further example in a schematic representation.

FIGS. 1 and 2 show two aspects of the invention. Photolithography is used to form recesses in a substrate 1 made of silicon. However, as long as the materials are suited for heat treatment, other materials may be used for the substrate 1, such as but not limited to GaAs, Ge, fused silica, glass, FR4 (printed board laminate), or plastic material such as fluidic micro electro mechanical systems (MEMS). In one aspect of the present disclosure V-shaped grooves are etched in an anisotropic wet-etching process. Other shapes of the grooves may be achieved also with standard HL-processes.

The recesses are linear after an etching step and form linear structural elements 2 at the surface of the substrate 1. The linear structural elements 2, which are aligned substantially parallel with one another, have a trapezoidal (FIG. 1) or rectangular (FIG. 2) cross-section. The linear structural elements 2 have a height h1 and a structural element width d. The linear structural elements 2 repeat periodically.

Subsequently, a reflective layer 5 of aluminum can be formed, by magnetron sputtering for example, over the total surface of the substrate 1, that is also above the linear structural elements 2. The deposited reflective layer 5 forms a surface structure in wave-like manner so that between the linear structural elements 2 in troughs the surface structure had a layer thickness h2 in the middle between two of the adjacent linear structural elements 2 and above the linear structural elements 2 a height H. A sinusoidal surface structure was able to be achieved after formation of the reflective layer 5.

In the aspect shown in FIG. 1, the linear structural elements 2 having a triangular cross-section were formed by wet chemical etching or anisotropic etching on the surface of the substrate 1 which is formed from (100)-silicon. On a variation of the parameters or of the substrate orientation, however, other cross-sectional elements for the linear structural elements 2, for example rectangular cross-sections, as shown in the example of FIG. 2, can also be formed.

A layer 3 of borophosphosilicate glass (BSG) was deposited on the substrate 1 prepared in this way and the surface structure formed using the linear structural elements 2 was shaped, or rounded (by larger layer thicknesses). Subsequently, the substrate 1 with the layer 3 was annealed and a further plastic deformation of the layer 3 was achieved by the heating, which resulted in a substantial sinusoidal surface on the surface of the layer 3 with alternating arranged wave peaks and wave troughs which are arranged between the structural elements 2.

At least one further layer 4, for example of silicon nitride, can be applied to the layer 3 to achieve a further compensation of residual strains in the layer 3 and the substrate 1.

A reflective layer 5 can be applied directly to the layer 3 or, as shown in FIGS. 1 and 2, also applied to the further layer 4. The reflective layer 5 has been deposited from aluminium in this aspect of the disclosure.

The thicknesses d3, d4 and d5 of the layers 3, 4 and 5, the geometry, the dimensioning a, b and hi as well as the spacings of the linear structural elements 2 have been selected in this so that a substantially sinusoidal surface topology and freedom from residual strain were able to be reached at the surface of the micro-optical diffraction grating.

The microscopic electromagnetic radiation diffraction grating is produced as part of a micro electro-mechanical system (MEMS). The micro electro-mechanical system further comprises a micro actuator for pivoting the microscopic electromagnetic radiation diffraction grating. The microscopic electromagnetic radiation diffraction grating is an integral part of the micro electro mechanical system. The micro actuator and the microscopic electromagnetic radiation diffraction grating are manufactured in subsequent steps of a silicon process. This micro electro-mechanical system may be used in micro-spectrometers.

While various embodiments of the present invention have been described above, it should be understood that they have been presented by way of example, and not limitation. It will be apparent to persons skilled in the relevant arts that various changes in form and detail can be made therein without departing from the scope of the invention. Thus, the present invention should not be limited by any of the above-described exemplary embodiments, but should be defined only in accordance with the following claims and their equivalents.

The invention claimed is:

1. A microscopic electromagnetic radiation diffraction grating comprising:
   a substrate having a surface structure on a surface of said substrate wherein the surface structure comprises linear structural elements arranged substantially equidistantly and aligned substantially parallel to one another, said structural elements having a trapezoidal cross-section forming a linear contour;
   a plastically deformable compensation layer disposed over the surface structure; and
   at least one reflecting layer disposed at least partially over said plastically deformable compensation layer;
   said at least one reflecting layer having a substantially continuous uniform surface contoured substantially sinusoidal in wave shape and having alternating arranged wave peaks and wave troughs wherein the substantially continuous uniform surface has a periodic shape independent of the periodic shape of the linear contour of said surface structure formed of the trapezoidal cross-section, wherein the substantially continuous uniform surface is configured to reflect and diffract a radiation incident to the surface of said substrate.

2. A microscopic electromagnetic radiation diffraction grating in accordance with claim 1, wherein the said surface of said substrate is a substantially smooth planar surface.

3. A microscopic electromagnetic radiation diffraction grating in accordance with claim 1, wherein the at least one reflecting layer is adapted to substantially reflect electromagnetic radiation in use.

4. A microscopic electromagnetic radiation diffraction grating in accordance with claim 3, wherein the at least one reflecting layer is formed from at least one of a highly reflecting metal or a metal alloy.

5. A microscopic electromagnetic radiation diffraction grating in accordance with claim 4, wherein one of the at least one reflecting layer is made from at least one of aluminum, silver, gold or an alloy thereof.

6. A microscopic electromagnetic radiation diffraction grating in accordance with claim 1 and having a plurality of layers, wherein said plurality of layers are alternatingly arranged as layers of a material having a higher optical refractive index and layers of a material having a lower optical refractive index.

7. A microscopic electromagnetic radiation diffraction grating in accordance with claim 1, wherein at least one of the at least one reflecting layer has a layer thickness corresponding to a whole number multiple $\lambda/4$ of a wavelength $\lambda$.

8. A microscopic electromagnetic radiation diffraction grating in accordance with claim 1, wherein atoms of further elements are implanted in at least one of the at least one reflecting layer.

9. A microscopic electromagnetic radiation diffraction grating in accordance with claim 1, further comprising at least one additional layer arranged on a rear side of said substrate.

10. A microscopic electromagnetic radiation diffraction grating in accordance with claim 9, wherein said substrate is curved.

11. The microscopic electromagnetic radiation diffraction grating in accordance with claim 1, wherein the substantially continuous uniform surface is achieved by thermally treating the at least one reflecting layer.

12. The microscopic electromagnetic radiation diffraction grating in accordance with claim 1, wherein the plastically deformable compensation layer includes at least two layers formed from different materials.

13. The microscopic electromagnetic radiation diffraction grating in accordance with claim 12, wherein a first layer of the at least two layers of the plastically deformable compensation layer is formed from borophosphosilicate glass (BSG).

14. The microscopic electromagnetic radiation diffraction grating in accordance with claim 12, wherein a second layer of the at least two layers of the plastically deformable compensation layer is formed from silicon nitride.

15. The microscopic electromagnetic radiation diffraction grating in accordance with claim 1, wherein the plastically deformable compensation layer includes borophosphosilicate glass (BSG).

16. A device for measuring spectra of microscopic samples or microscopic areas on samples comprising a microscopic electromagnetic radiation diffraction grating according to claim 1; actuator for mechanically steering a support element; and said microscopic electromagnetic radiation diffraction grating being mounted on said support element or being an integral part of said support element.

* * * * *